US006972303B1

(12) United States Patent
Miyabayashi et al.

(10) Patent No.: US 6,972,303 B1
(45) Date of Patent: Dec. 6, 2005

(54) INK COMPOSITION PROVIDING IMAGE EXCELLENT IN LIGHT STABILITY

(75) Inventors: Toshiyuki Miyabayashi, Nagano (JP); Shinichi Kato, Nagano (JP)

(73) Assignee: Seiko Epson Corporation, Tokyo-To (JP)

( * ) Notice: Subject to any disclaimer, the term of this patent is extended or adjusted under 35 U.S.C. 154(b) by 0 days.

(21) Appl. No.: 09/486,129

(22) PCT Filed: Jun. 24, 1999

(86) PCT No.: PCT/JP99/03375

§ 371 (c)(1),
(2), (4) Date: Feb. 23, 2000

(87) PCT Pub. No.: WO99/67337

PCT Pub. Date: Dec. 29, 1999

(30) Foreign Application Priority Data

| Jun. 24, 1998 | (JP) | 10/177887 |
| Nov. 6, 1998 | (JP) | 10/315998 |
| Nov. 24, 1998 | (JP) | 10/333013 |

(51) Int. Cl.[7] .................... C09D 11/10; C08K 9/10; C08L 39/00; C08L 45/00
(52) U.S. Cl. .................. 523/160; 523/205; 524/548; 524/553
(58) Field of Search ............ 523/160, 161, 523/200, 205; 106/31.28, 31.6; 524/87, 91, 524/336, 548, 553, 556, 720, 100, 718, 721, 524/725, 715

(56) References Cited

U.S. PATENT DOCUMENTS

| 3,337,356 | A | * | 8/1967 | Carboni ..................... 525/588 |
| 4,043,962 | A | * | 8/1977 | Adler et al. ................ 524/510 |
| 4,504,628 | A | * | 3/1985 | Johnson .................... 525/278 |
| 4,605,596 | A | * | 8/1986 | Fry ......................... 428/432.2 |
| 5,093,038 | A | * | 3/1992 | Durand ..................... 252/514 |
| 5,128,386 | A | * | 7/1992 | Rehmer et al. .............. 522/35 |
| 5,239,028 | A | * | 8/1993 | Nakagawa et al. .......... 526/265 |
| 5,321,112 | A | * | 6/1994 | Olson ....................... 528/75 |
| 5,348,580 | A | * | 9/1994 | Chassot .................... 106/410 |
| 5,350,786 | A | * | 9/1994 | Costanzi et al. ............ 524/102 |
| 5,457,081 | A | * | 10/1995 | Takiguchi et al. .......... 503/227 |
| 5,891,961 | A | * | 4/1999 | Kawamura et al. ......... 525/169 |
| 5,990,202 | A | * | 11/1999 | Nguyen et al. ............. 523/201 |
| 5,998,501 | A | * | 12/1999 | Tsutsumi et al. ........... 523/160 |
| 6,040,358 | A | * | 3/2000 | Page et al. ................. 523/161 |
| 6,084,619 | A | * | 7/2000 | Takemoto et al. ........... 347/96 |
| 6,248,805 | B1 | * | 6/2001 | Nguyen et al. ............. 523/160 |

FOREIGN PATENT DOCUMENTS

| JP | 4999328 | 9/1974 |
| JP | 9241327 | 9/1997 |
| JP | 9255907 | 9/1997 |
| JP | 1112519 | 1/1999 |
| JP | 11199808 | 7/1999 |

OTHER PUBLICATIONS

Brandup, J., Immergut, E.H., and Grulke, E.A; Polymer Handbook 4th Ed., John Wiley and Sons, New York (pp. VI-229 to VI-231), 1999.*
Flick, Ernest; Plastics Additives An Industrial Guide, Noyes Publications, New Jersey, 1993 (page 901).*
Patent Abstracts of Japan of JP 4999328A dated Sep. 19, 1974.
Patent Abstracts of Japan of JP 1112519A dated Jan. 19, 1999.
Patent Abstracts of Japan of JP 924132A dated Sep. 16, 1997.
Patent Abstracts of Japan of JP 9255907A dated Sep. 30, 1997.
Patent Abstracts of Japan of JP 10279854A dated Oct. 20, 1998.
Patent Abstracts of Japan of JP 11199808A dated Jul. 27, 1999.

* cited by examiner

Primary Examiner—Callie Shosho
(74) Attorney, Agent, or Firm—Ladas & Parry LLP

(57) ABSTRACT

Disclosed are a colorant which can realize an ink compositions possessing excellent lightfastness, waterfastness, color development, and rubbing/scratch resistance, and an ink composition containing the same. The ink composition comprises at least a colorant, a polymer covering the colorant and having, in its molecular chain, sites possessing ultraviolet absorbing activity and/or photostabilizing activity, water, and a water-soluble organic solvent. The ink composition according to the present invention include two preferred embodiments. In the ink composition according to the first preferred embodiment, the polymer functions as a dispersant and covers the colorant. In the ink composition according to the second preferred embodiment, the polymer is in the form of fine particles covering the colorant. Further, the colorant comprises: a dye or a pigment; and a polymer covering the colorant and having, in its molecular chain, sites possessing ultraviolet absorbing activity and/or photostabilizing activity, the dye or the pigment being in the form of fine particles.

21 Claims, 3 Drawing Sheets

INK COMPOSITION PROVIDING IMAGE EXCELLENT IN LIGHT STABILITY

BACKGROUND OF THE INVENTION

1. Field of the Invention

The present invention relates to an ink composition and a colorant for use in the ink composition, and more particularly to an ink composition suitable for ink jet recording and a colorant for use in the ink composition.

2. Background Art

A solvent for dissolving or dispersing a colorant is essential to an ink composition. A mixed solvent composed of water and a water-soluble organic solvent has been extensively used as the solvent from the viewpoint of safety. Upon the application of an ink composition on a recording medium, the solvent penetrates the recording medium or evaporates to permit the colorant component to be fixed onto the recording medium, thereby recording letters or other images on the recording medium. Various properties are required of the formed images, and examples thereof include no feathering or bleeding of images, excellent color development, no blurring of images upon contact with water (that is, good in waterfastness), less tendency to cause a deterioration in images upon rubbing (that is, good in rubbing/scratch resistance), and no color change of images with the elapse of time (that is, good in lightfastness).

Regarding waterfastness and lightfastness among the property, various proposals have been made in the art to improve these properties.

Water-soluble dyes, by virtue of good water solubility, have been extensively used as colorants for water-base ink compositions. For images produced using an ink composition containing a water-soluble dye, however, the good water solubility disadvantageously leads to a fear of the dye being again dissolved upon contact with water. In other words, the ink composition using a water-soluble dye suffers from a waterfastness problem of printed images. Further, it has been pointed out that dyes generally have poor lightfastness. Therefore, for ink compositions containing a dye, an improvement in waterfastness and lightfastness of printed images has been desired in the art.

On the other hand, ink compositions with a water-insoluble colorant, such as a pigment, being dispersed therein instead of the water-soluble colorant have been proposed in the art. In the case of water-insoluble colorants, dispersants are generally used to disperse the colorants in a water-based solvent. The dispersant, however, upon contact of a printed image with water, sometimes functions to again dissolve the colorant in water. This leads to an unsatisfactory improvement in waterfastness of the printed image.

It has been pointed out that, although inorganic pigments, such as carbon black, and metal-containing organic pigments, such as copper phthalocyanine pigment, are excellent in lightfastness, most of the other organic pigments cannot produce images having satisfactory lightfastness. Therefore, improving the lightfastness of the ink composition using the organic pigment as the colorant has been required in the art.

In recent years, a color image has been formed with a plurality of ink compositions. In the color image using the plurality of ink compositions, the presence of only one color having poor lightfastness leads to a change in hue of the image and consequently extremely deteriorates the quality of the color image. Thus, more controlled lightfastness is required of color ink compositions.

Further, in recent years, ink jet recording printers have become widely spread. Ink jet recording is a printing method wherein droplets of an ink composition are ejected and deposited onto a recording medium such as paper to conduct printing. This printing method is advantageous in that a high-resolution, high-quality image can be printed at a high speed using a relatively inexpensive apparatus. In particular, a color ink jet recording apparatus can provide an improved image quality and has become used as an output device for photographs and also as a digital printer, a plotter, a CAD output device and the like. Images printed by the ink jet recording printer which has become widely used in the art are considered utilizable in various forms. In particular, photograph-like prints could be put for display in a place exposed to light emitted from a fluorescent lamp or direct sunlight in the open for a long period of time. Therefore, lightfastness is a very important property requirement to be satisfied by the ink composition used in the ink jet recording.

The addition of an ultraviolet absorber or a photostabilizer to the ink composition is considered effective for improving the lightfastness of the ink composition. Since, however, most of the ultraviolet absorbers and the photostabilizers are oil soluble, the presence thereof in a satisfactory amount in the water-soluble ink composition is difficult.

SUMMARY OF THE INVENTION

The present inventors have now found that the inclusion of a colorant in a polymer having, in its molecular chain, sites possessing ultraviolet absorbing activity or photostabilizing activity can provide an ink composition possessing excellent properties, particularly excellent lightfastness, waterfastness, color development, and rubbing/scratch resistance.

Accordingly, it is an object of the present invention to provide an ink composition possessing excellent properties, particularly excellent lightfastness, waterfastness, color development, and rubbing/scratch resistance.

It is another object of the present invention to provide a colorant which can realize an ink composition possessing excellent properties, particularly excellent lightfastness, waterfastness, color development, and rubbing/scratch resistance.

According to one aspect of the present invention, there is provided an ink composition comprising at least a colorant; a polymer covering the colorant and having, in its molecular chain, sites possessing ultraviolet absorbing activity and/or photostabilizing activity; water; and a water-soluble organic solvent.

The ink composition according to the present invention includes two preferred embodiments.

In the ink composition according to the first preferred embodiment, the polymer functions as a dispersant and covers the colorant.

In the ink composition according to the second preferred embodiment, the polymer is in the form of fine particles covering the colorant.

According to another aspect of the present invention, there is provided a colorant comprising: a dye or a pigment; and a polymer covering the dye or the pigment and having, in its molecular chain, sites possessing ultraviolet absorbing activity and/or photostabilizing activity, the colorant being in the form of fine particles.

DETAILED DESCRIPTION OF THE INVENTION

Ink Composition

Figure 1:
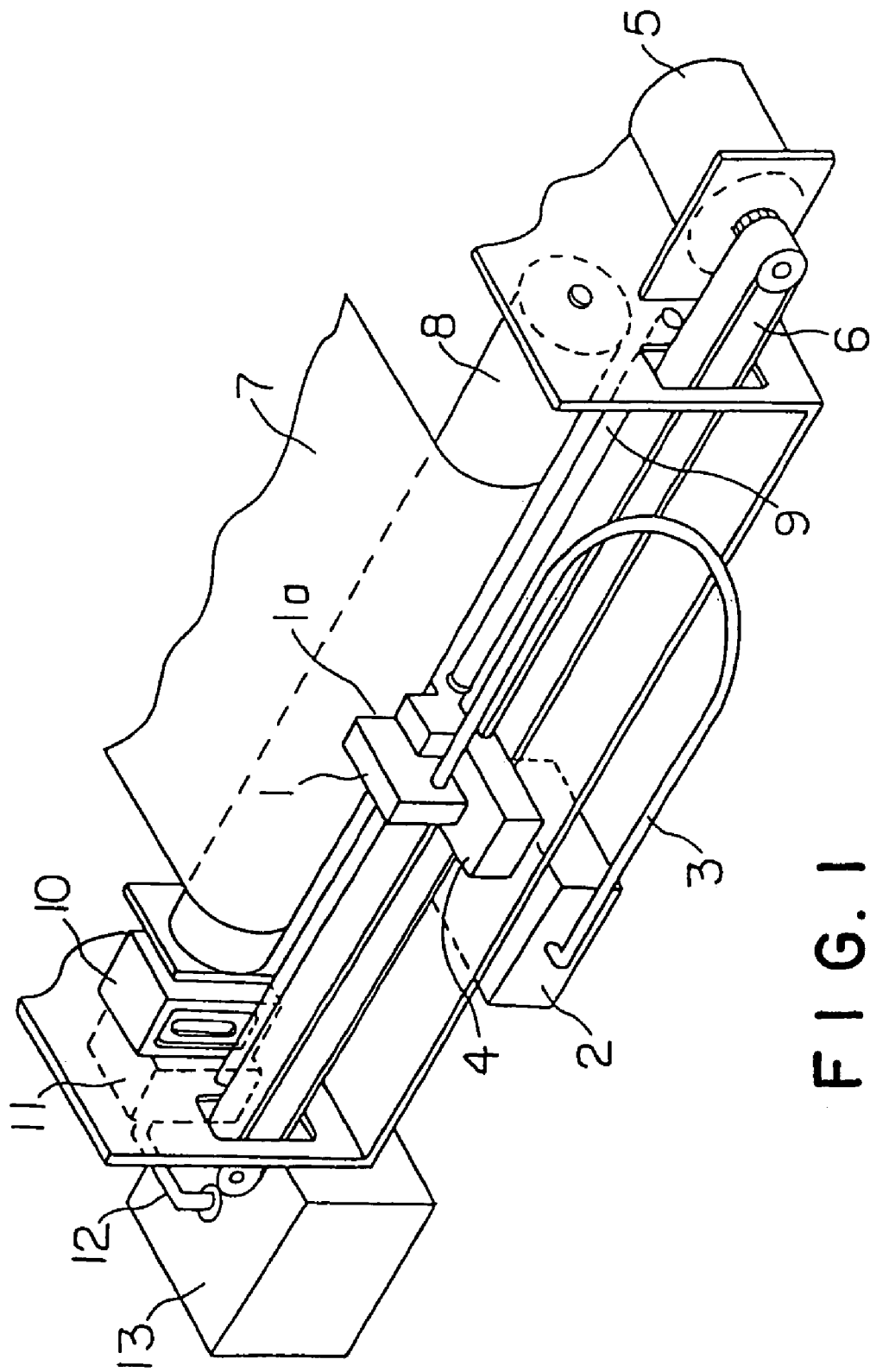
FIG. 1 is a diagram showing an ink jet recording apparatus, wherein a recording head is provided separately from an ink tank and an ink composition is fed into the recording head through an ink tube.

The ink composition according to the present invention may be used in recording methods using an ink composition. Recording methods using an ink composition include, for example, an ink jet recording method, a recording method using writing utensils, such as pens, and other various printing methods. Particularly preferably, the ink composition according to the present invention is used in the ink jet recording method.

The ink composition according to the present invention comprises at least a colorant; a polymer covering the colorant and having, in its molecular chain, sites possessing ultraviolet absorbing activity and/or photostabilizing activity; water; and a water-soluble organic solvent. According to the present invention, that the polymer "covers" a colorant, preferably refers to a state such that the polymer functions as a dispersant and covers a colorant or that the polymer covers a colorant and is in the form of fine particles.

Further, according to the present invention, the ultraviolet absorbing activity refers to such a property as to absorb ultraviolet energy which is ultimately released as thermal energy. For example, the property is such that the keto-enol tautomerism gradually converts ultraviolet energy to thermal energy which is then released. The photostabilizing activity refers to such a property that can capture radicals generated by ultraviolet energy, can decompose hydroperoxide, scavenge heavy metals, and quench singlet oxygen to eliminate the influence of radicals, hydroperoxide, heavy metals, and singlet oxygen, thereby stabilizing materials.

Ink Composition According to First Embodiment

The ink composition according to the first embodiment of the present invention comprises a polymer having, in its molecular chain, sites possessing ultraviolet absorbing activity and/or photostabilizing activity, the polymer functioning as a dispersant and covering a colorant. According to this embodiment, the polymer functions as a dispersant and surrounds the periphery of the colorant. Therefore, in this embodiment, the colorant and the dispersant are subjected to a dispersion process to give a colorant dispersion that is then added to an ink composition.

According to this embodiment of the present invention, the polymer has, in its molecular chain, sites possessing ultraviolet absorbing activity and/or photostabilizing activity.

According to a preferred embodiment of the present invention, the polymer refers to a polymer or a copolymer using, as a component for polymerization, a monomer having a site possessing ultraviolet absorbing activity and/or photostabilizing activity, or a polymer with a site possessing ultraviolet absorbing activity and/or photostabilizing activity being grafted thereon.

(a) Polymer

Examples of polymers constituting the skeleton in this embodiment include naturally occurring polymers, and specific examples thereof include: proteins, such as glue, gelatin, casein, and albumin; naturally occurring rubbers, such as gum arabic and tragacanth; glucosides, such as saponin; alginic acid and alginic acid derivatives, such as propylene glycol alginate, triethanolamine alginate, and ammonium alginate; and cellulose derivatives, such as methyl cellulose, carboxymethyl cellulose, hydroxyethyl cellulose, and ethylhydroxy cellulose.

According to a preferred embodiment of the present invention, examples of polymers as the skeleton include synthetic polymers. Specific examples thereof include water-soluble polymers soluble in water, such as acrylic copolymers, polyesters, polyamides, and polyurethanes. Among others, a copolymer of a monomer having a hydrophobic group with a monomer having a hydrophilic group or a polymer of a monomer having both hydrophobic and hydrophilic groups in its molecular structure is especially preferred. Another preferred examples of synthetic polymers include polyvinyl alcohols, polyvinyl pyrrolidones, acrylic resins, such as polyacrylic acid, acrylic acid/acrylonitrile copolymer, potassium acrylate/acrylonitrile copolymer, vinyl acetate/acrylic ester copolymer, and acrylic acid/acrylic ester copolymer, styrene/acrylic resins, such as styrene/acrylic acid copolymer, styrene/methacrylic acid copolymer, styrene/methacrylic acid/acrylic ester copolymer, styrene/α-methylstyrene/acrylic acid copolymer, and styrene/α-methylstyrene/acrylic acid/acrylic ester copolymer, styrene/maleic acid copolymer, styrene/maleic anhydride copolymer, vinylnaphthalene/acrylic acid copolymer, vinylnaphthalene/maleic acid copolymer, and vinyl acetate copolymers, such as vinyl acetate/ethylene copolymer, vinyl acetate/fatty acid vinylethylene copolymer, vinyl acetate/maleic ester copolymer, vinyl acetate/crotonic acid copolymer, and vinyl acetate/acrylic acid copolymer, and salts of the above polymers.

For the polymer, which functions as a dispersant, in this embodiment, any one of the number average molecular weight and the weight average molecular weight is preferably 1,000 to 50,000.

If necessary, in use, the polymer may be adjusted by the addition of a neutralizer, such as ammonium, an amine, an inorganic alkali.

According to a preferred embodiment of the present invention, the polymer is an acrylic polymer which may be produced by conventional solution polymerization.

In this embodiment, the site possessing the ultraviolet absorbing activity and/or the photostabilizing activity is selected from the group consisting of aromatic monocyclic hydrocarbon groups, fused polycyclic aromatic hydrocarbon groups, heteromonocyclic groups, and fused heterocyclic groups, and has absorbing activity in a wavelength region from 200 to 400 nm. Specific examples of sites having the ultraviolet absorbing activity and/or the photostabilizing activity include those having benzotriazole, benzophenone, salicylate, cyanoacrylate, and hindered phenol, or hindered amine skeletons.

Specific structures of these skeletons are as follows.

Benzophenone skeleton:

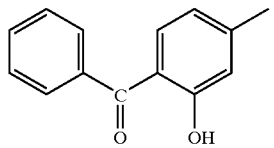

Benzotriazole skeleton:

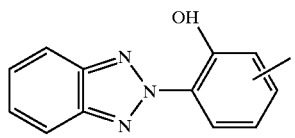

Hindered Phenol skeleton:

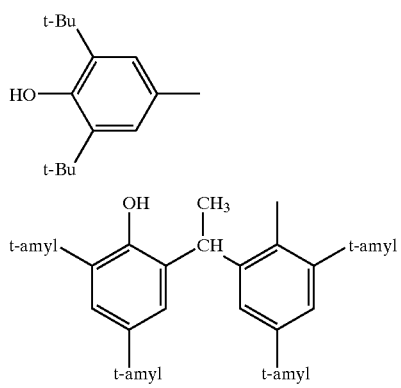

Salicylate skeleton:

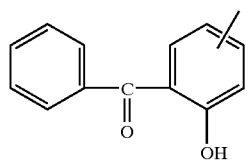

Cyanoacrylate skeleton:

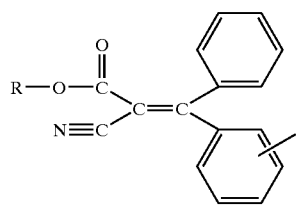

Hindered amine skeleton:

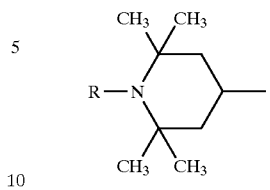

According to the present invention, the polymer having, in its molecular chain, sites possessing ultraviolet absorbing activity and/or photostabilizing activity may be a homopolymer produced by using, as a component for polymerization, a monomer having a site possessing ultraviolet absorbing activity and/or photostabilizing activity, or a copolymer produced by providing, as a component for polymerization, a monomer having a site possessing ultraviolet absorbing activity and copolymerizing this monomer with other monomer. Alternatively, the polymer having, in its molecular chain, sites possessing ultraviolet absorbing activity and/or photostabilizing activity may be produced by graft polymerizing a site possessing ultraviolet absorbing activity and/or photostabilizing activity onto a polymer. Preferred monomers, having sites possessing ultraviolet absorbing activity and/or photostabilizing activity, usable in the above production process include monomers having a site possessing ultraviolet absorbing activity and/or photostabilizing activity and an ethylenically unsaturated bond. Specific examples of such monomers include benzotriazole ultraviolet absorbers having an ethylenically unsaturated bond, benzophenone ultraviolet absorbers having an ethylenically unsaturated bond, salicylate ultraviolet absorbers having an ethylenically unsaturated bond, cyanoacrylate ultraviolet absorbers having an ethylenically unsaturated bond, hindered phenol ultraviolet absorbers having an ethylenically unsaturated bond, and hindered amine photostabilizers having an ethylenically unsaturated bond. The ethylenically unsaturated bond in these monomers may be provided as a methacryloyl, acryloyl, vinyl, or allyl group.

Specific examples thereof include the following monomers. At the outset, the following monomers may be mentioned as specific examples of monomers having an ultraviolet absorbing site with a benzophenone skeleton:

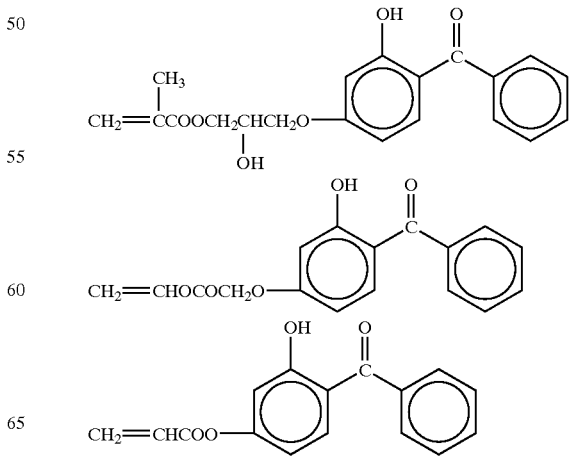

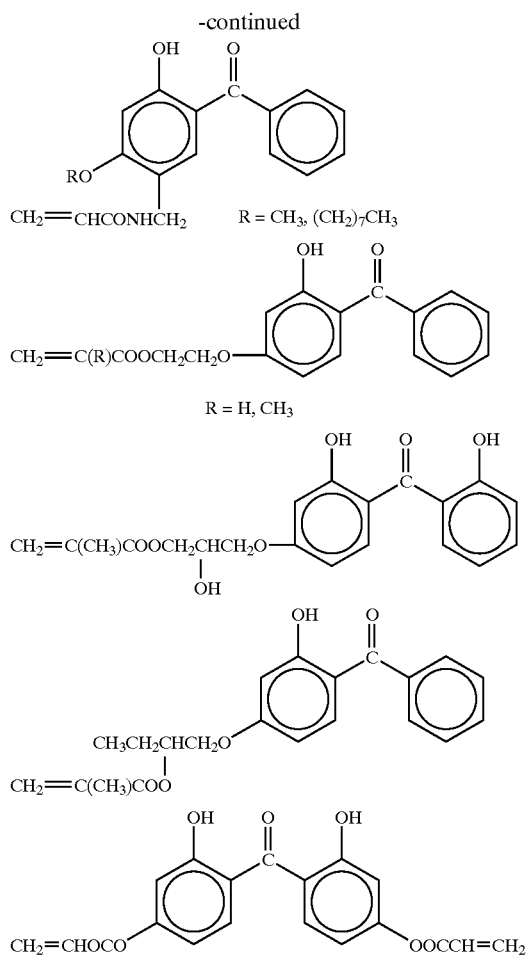
Specific examples of monomers having an ultraviolet absorbing site with a benzotriazole skeleton are as follows:
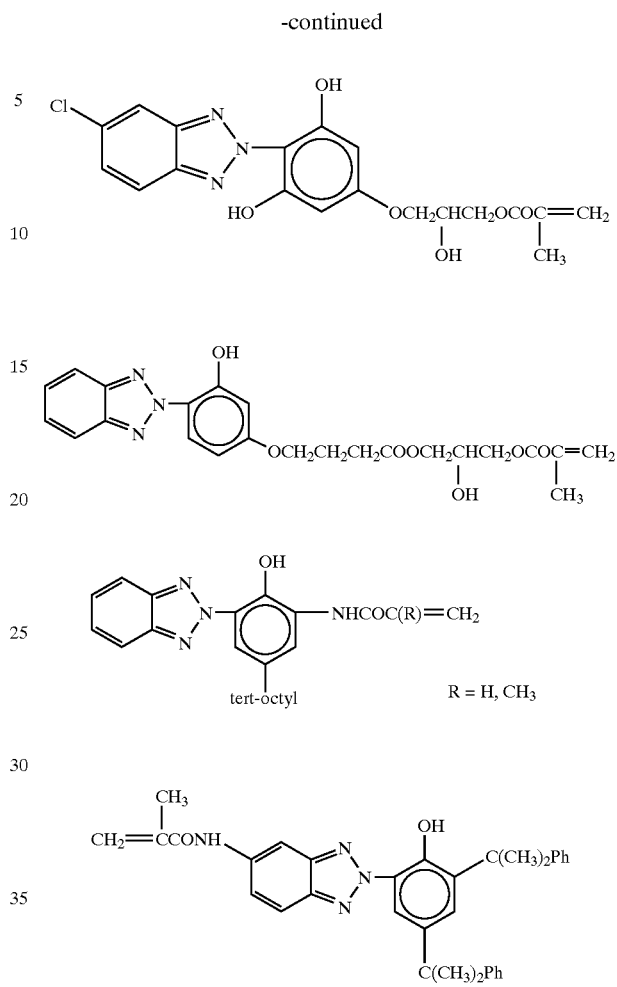
Specific examples of monomers having an ultraviolet absorbing site with a hindered phenol skeleton are as follows:

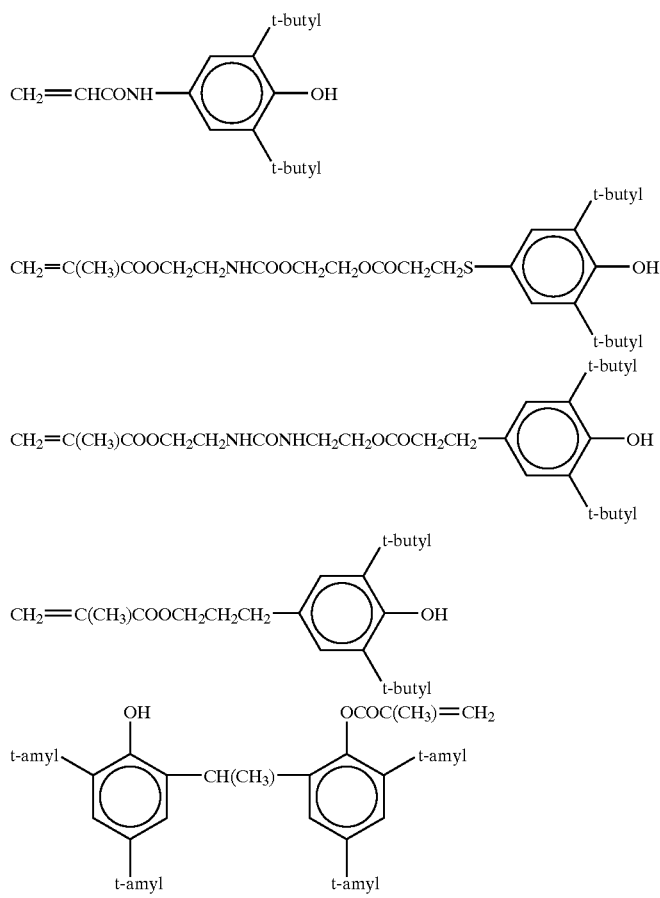
Specific examples of monomers having a photostabilizing site with a hindered amine skeleton are as follows:
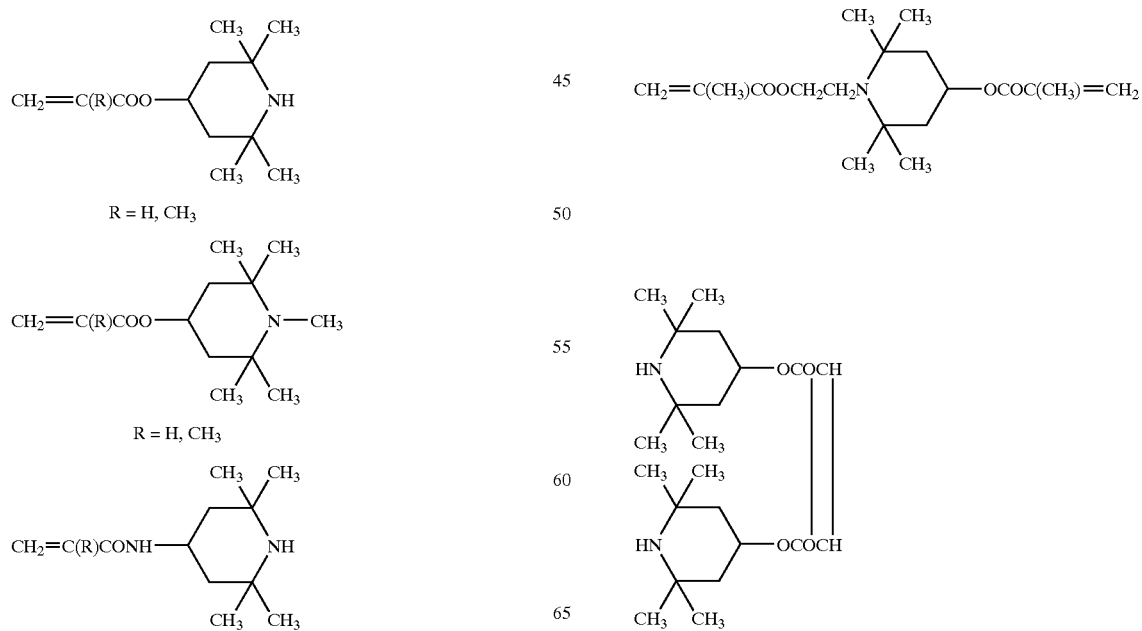

-continued

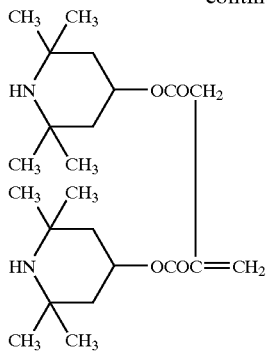

The monomer having a site possessing ultraviolet absorbing activity and/or photostabilizing activity may be a commercially available one. Examples thereof include: RUVA-93 (2-(2'-hydroxy-5-methylacryloxyethylphenyl)-2H-benzotriazole), available from Otsuka Chemical Co., Ltd., as the monomer having an ultraviolet absorbing site with a benzotriazole skeleton; and ADK STAB LA-82 (1,2,2,6,6-pentamethyl-4-piperidyl methacrylate) and ADK STAB LA-87 (2,2,6,6-tetramethyl-4-piperidyl methacrylate), available from Asahi Denka Kogyo Ltd., as the monomer having a photostabilizing site with a hindered amine skeleton.

The polymer used in this embodiment may be produced by conventional solution polymerization. For example, the polymer may be produced by solution polymerizing a monomer having a site possessing ultraviolet absorbing activity and/or photostabilizing activity and other monomer component in the presence of a polymerization catalyst in a solvent. The solution polymerization is described in known literature, for example, in Japanese Patent Laid-Open No. 162163/1984, Japanese Patent Publication Nos. 11542/1990, 7901/1990, and 7897/1990.

Examples of other monomers, which may be polymerized together with the monomer having a site possessing ultraviolet absorbing activity and/or photostabilizing activity include: vinyl esters, for example, acrylic esters or methacrylic esters, such as methyl (meth)acrylate, ethyl (meth)acrylate, isopropyl (meth)acrylate, n-butyl (meth)acrylate, isobutyl (meth)acrylate, n-amyl (meth)acrylate, isoamyl (meth)acrylate, n-hexyl (meth)acrylate, 2-ethylhexyl (meth)acrylate, octyl (meth)acrylate, decyl (meth)acrylate, dodecyl (meth)acrylate, octadecyl (meth)acrylate, cyclohexyl (meth)acrylate, phenyl (meth)acrylate, benzyl (meth)acrylate, 2-hydroxyethyl (meth)acrylate, hydroxypropyl (meth)acrylate, glycidyl methacrylate, and glycidyl acrylate, and vinyl acetate; acrylonitrile, methacrylonitrile and the like; aromatic vinyl compounds, such as styrene, 2-methylstyrene, vinyltoluene, t-butylstyrene, chlorostyrene, vinylanisole, vinylnaphthalene, and divinylbenzene; halogenated vinylidene, such as vinylidene chloride and vinylidene fluoride; ethylene, propylene, isopropylene, butadiene, vinylpyrrolidone, vinyl chloride, vinyl ether, vinyl ketone, chloroprene and the like, and carboxyl-containing compounds, for example, ethylenically unsaturated carboxylic acids, such as acrylic acid, methacrylic acid, maleic acid, or monoalkyl esters thereof, itaconic acid or monoalkyl esters thereof, fumaric acid or monoalkyl esters thereof; amido-containing compounds, such as acrylamide and N,N-dimethylacrylamide, and alkylamino esters of acrylic acid or methacrylic acid, for example, amino-containing compounds, such as N-methylaminoethyl methacrylate, N-methylaminoethyl acrylate, dimethylaminoethyl methacrylate, dimethylaminoethyl acrylate, diethylaminoethyl methacrylate, and diethylaminoethyl methacrylate; unsaturated amides containing an alkylamino group, such as N-(2-dimethylaminoethyl)acrylamide, N-(2-dimethylaminoethyl)methacrylamide, and N,N-dimethylaminopropylacrylamide, monovinylpyridines, such as vinylpyridine, and vinyl ethers containing an alkylamino group, such as dimethylaminoethyl vinyl ether; and vinylimidazole and the like and compounds containing a sulfonic group, such as vinylsulfonic acid, styrenesulfonic acid and salts thereof and 2-acryloylamino-2-methylpropanesulfonic acid and salts thereof. These monomers may be used alone or as a mixture of two or more.

According to a preferred embodiment of the present invention, the polymer has hydrophilic and hydrophobic groups in its structure. Examples of hydrophilic groups include carboxyl, sulfonic acid, phosphoric acid, amido, and amino groups. These may be contained alone or in a combination of two or more.

Monomers having a hydrophilic group include, among the above monomers, for example, carboxyl-containing compounds, for example, ethylenically unsaturated carboxylic acids, such as acrylic acid, methacrylic acid, maleic acid, or monoalkyl esters thereof, itaconic acid or monoalkyl esters thereof, fumaric acid or monoalkyl esters thereof; amido-containing compounds, such as acrylamide and N,N-dimethylacrylamide, and alkylamino esters of acrylic acid or methacrylic acid, for example, amino-containing compounds, such as N-methylaminoethyl methacrylate, N-methylaminoethyl acrylate, dimethylaminoethyl methacrylate, dimethylaminoethyl acrylate, diethylaminoethyl methacrylate, and diethylaminoethyl methacrylate; unsaturated amides containing an alkylamino group, such as N-(2-dimethylaminoethyl)acrylamide, N-(2-dimethylaminoethyl) methacrylamide, and N,N-dimethylaminopropylacrylamide, monovinylpyridines, such as vinylpyridine, and vinyl ethers containing an alkylamino group, such as dimethylaminoethyl vinyl ether; and vinylimidazole and the like and compounds containing a sulfonic group, such as vinylsulfonic acid, styrenesulfonic acid and salts thereof and 2-acryloylamino-2-methylpropanesulfonic acid and salts thereof.

Examples of hydrophobic groups include alkyl, substituted alkyl, aromatic monocyclic hydrocarbon, fused polycyclic aromatic hydrocarbon, heteromonocyclic, and fused heterocyclic groups. These may be contained alone or in a combination of two or more.

In this embodiment, the polymer may be any of a random copolymer, a block copolymer, or a graft copolymer.

According to the first embodiment of the present invention, the amount of the polymer added may be properly determined. The amount, however, may be preferably about 0.01 to 30% by weight, more preferably about 0.1 to 20% by weight, based on the ink composition.

(b) Colorant

According to the first embodiment of the present invention, the colorant may be either a dye or a pigment with the pigment being preferred.

Dyes usable herein include various dyes, such as oil-soluble dyes, direct dyes, acid dyes, foodstuff dyes, basic dyes, reactive dyes, disperse dyes, vat dyes, soluble vat dyes, and reactive disperse dyes.

Regarding the pigment, inorganic and organic pigments are usable. Examples of the inorganic pigment include carbon blacks produced by known processes, such as contact, furnace, and thermal processes. Examples of the organic pigment include azo pigments (including azo lake, insoluble azo pigment, fused azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

In particular, carbon blacks usable for black inks include: No. 2300, No. 900, MCF 88, No. 33, No. 40, No. 45, No. 52, MA7, MA8, MA100, No. 2200B and the like, manufactured by Mitsubishi Chemical Corporation; Raven 5750, Raven 5250, Raven 5000, Raven 3500, Raven 1255, Raven 700 and the like, manufactured by Columbian Carbon Co., Ltd.; Regal 400R, Regal 330R, Rega 1660R, Mogul L, Monarch 700, Monarch 800, Monarch 880, Monarch 900, Monarch 1000, Monarch 1100, Monarch 1300, Monarch 1400 and the like, manufactured by Cabot Corporation; and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4, manufactured by Degussa. Pigments usable for yellow inks include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 128, C.I. Pigment Yellow 129, C.I. Pigment Yellow 151, and C.I. Pigment Yellow 154. Pigments usable for magenta inks include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 123, C.I. Pigment Red 168, C.I. Pigment Red 184, and C.I. Pigment Red 202. Pigments usable for cyan inks include C.I. Pigment Blue 1, C.I. Pigment Blue 2, C.I. Pigment Blue 3, C.I. Pigment Blue 15:3, C.I. Pigment Blue 15:34, C.I. Pigment Blue 16, C.I. Pigment Blue 22, C.I. Pigment Blue 60, C.I. Vat Blue 4, and C.I. Vat Blue 60.

The particle diameter of the pigment is preferably not more than 10 µm, more preferably not more than 0.1 µm.

(c) Water-soluble Organic Solvent

The ink composition according to the first embodiment of the present invention comprises a water-soluble organic solvent. This water-soluble organic solvent is preferably a high-boiling organic solvent. Preferred examples of high-boiling organic solvents usable herein include polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; and 1,3-dimethyl-2-imidazolidinone.

The amount thereof added is preferably 10 to 40% by weight, more preferably 10 to 20% by weight, based on the ink.

According to a preferred embodiment of the present invention, in addition to the high-boiling organic solvent, a low-boiling organic solvent may be added to the ink composition from the viewpoint of shortening the drying time of printed images produced from the ink composition. Examples of preferred low-boiling organic solvents include methanol, ethanol, n-propyl alcohol, iso-propyl alcohol, n-butanol, sec-butanol, tert-butanol, iso-butanol, and n-pentanol. Monohydric alcohols are particularly preferred. Although the amount of the low-boiling organic solvent added may be properly determined, it is preferably in the range of about 10 to 40% by weight, more preferably in the range of 10 to 20% by weight, based on the ink.

(d) Other Ingredients

The ink composition according to the first embodiment of the present invention preferably contains an alkali hydroxide, a tertiary amine, or ammonia. The addition of these compounds can provide an ink composition which causes neither agglomeration of the colorant nor an increase in viscosity of the colorant even after storage for a long period of time, that is, possesses excellent storage stability, and, even when allowed to stand in an open state (that is, when allowed to stand in contact with air at room temperature), can maintain the fluidity and the redispersibility for a long period of time, and, in addition, does not cause clogging of nozzles during printing or at the time of restarting after interruption of printing, thus offering high ejection stability.

Examples of alkali hydroxides, which may be added to the ink composition of the present invention, include potassium hydroxide, sodium hydroxide, and lithium hydroxide, and the amount of the alkali hydroxide added to the ink composition is preferably about 0.01 to 5% by weight, more preferably about 0.05 to 3% by weight.

Examples of tertiary amines, which may be added to the ink composition of the present invention, include trimethylamine, triethylamine, triethanolamine, dimethylethanolamine, diethylethanolamine, triisopropenolamine, and butyldiethanolamine. They may be used alone or in combination of two or more. The amount of the tertiary amine added to the ink composition is preferably about 0.1 to 10% by weight, more preferably about 0.5 to 5% by weight.

The ink composition according to the present invention may further comprise a surfactant. Examples of surfactants usable herein include anionic surfactants (for example, sodium dodecylbenzenesulfonate, sodium laurylate, and an ammonium salt of polyoxyethylene alkyl ether sulfates), nonionic surfactants (for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides), and acetylene glycol (OLFINE Y and Surfynol 82, 104, 440, 465, and 485 (all the above products being manufactured by Air Products and Chemicals Inc.). They may be used alone or in combination of two or more.

According to a preferred embodiment of the present invention, the ink composition according to the present invention may contain a saccharide. Saccharides, which may be added to the ink composition, include monosaccharides, disaccharides, oligosaccharides (including trisaccharides and tetrasaccharides), and polysaccharides, and preferred examples thereof include glucose, mannose, fructose, ribose, xylose, arabinose, galactose, aldonic acid, glucitol, sorbit, maltose, cellobiose, lactose, sucrose, trehalose, and maltotriose. The polysaccharides refer to saccharides in a wide sense and embrace materials which widely exist in the natural world, such as alginic acid, α-cyclodextrin, and cellulose. Derivatives of these saccharides include reducing sugars of the above saccharides (for example, sugar alcohols represented by the general formula $HOCH_2(CHOH)_nCH_2OH$ wherein n is an integer of 2 to 5), oxidized sugars (for example, aldonic acid and uronic acid), amino acid, and thiosugars. Sugar alcohols are particularly preferred, and specific examples thereof include maltitol and sorbit. The content of the saccharide is preferably about 0.1 to 40% by weight, more preferably 1 to 30% by weight, based on the ink.

Further, the ink composition according to the present invention may contain fine particles of a polymer, and examples of the fine particles of the polymer usable in the present invention include fine particles of acrylic polymer, vinyl acetate polymer, styrene/butadiene copolymer, (meth) acrylate/styrene copolymer, butadiene polymer, and styrene polymer. The diameter of the fine particles of these polymers is preferably not more than about 200 nm, more preferably about 5 to 200 nm.

According to a preferred embodiment of the present invention, the fine particles of the polymer is dispersed, in the ink composition, as dispersed particles of a polymer emulsion. Specifically, in preparing the ink composition according to the present invention, the fine particles of the polymer is preferably mixed in a polymer emulsion form with ingredients for constituting the ink composition. The fine particles of the polymer may be one which is commercially available as a polymer emulsion, and examples thereof include Microgel E-1002 and E-5002 (styrene/acrylic polymer emulsion, manufactured by Nippon Paint Co., Ltd.), Voncoat 4001 (acrylic polymer emulsion, manufactured by Dainippon Ink and Chemicals, Inc.), Voncoat 5454 (styrene/acrylic polymer emulsion, manufactured by Dainippon Ink and Chemicals, Inc.), SAE-1014 (styrene/acrylic polymer emulsion, manufactured by Nippon Zeon Co., Ltd.), and Saivinol SK-200 (acrylic polymer emulsion, manufactured by Saiden Chemical Industry Co., Ltd).

According to a preferred embodiment of the present invention, the polymer constituting the fine particles of the polymer has a glass transition point of 30° C. or below. The use of this polymer permits the ink composition according to the present invention to surely form a film at room temperature.

According to a preferred embodiment of the present invention, when the fine particles of the polymer are dispersed, as dispersed particles of a polymer emulsion, in the ink composition, the polymer emulsion has a minimum film-forming temperature of 30° C. or below. In this case, the term "minimum film-forming temperature" used herein refers to a minimum temperature at which, when the polymer emulsion is thinly cast onto a sheet of a metal, such as aluminum, to form a coating which is then gradually heated, a transparent, continuous film is formed. This embodiment can improve fast drying, drying to the touch, rubbing/scratch resistance, and waterfastness of prints.

If necessary, pH adjusters, preservatives, antimolds, phosphorus antioxidants and the like may be contained in the ink composition according to the first embodiment of the present invention.

The ink composition according to the present invention can be prepared by dispersing and mixing the above components using a suitable method. Preferably, the pigment, the polymeric dispersant, and water are first mixed together by means of a suitable dispergator (for example, an agitator, a homogenizer, a twin-screw mixer, a disperser, or an ultrasonic homogenizer) to prepare a homogeneous colorant dispersion. Subsequently, a water-soluble organic solvent having a boiling point of 180° C. or above, a saccharide, a pH adjustor, a preservative, an antimold and the like are added to and satisfactorily dissolved in water to prepare a solvent for ink. The solvent for ink is gradually added dropwise to the colorant dispersion while stirring by means of a suitable dispergator, followed by further thorough stirring. After thorough stirring, coarse particles and foreign matter causative of nozzle clogging are removed by filtration to prepare a contemplated ink composition.

Ink Composition According to Second Embodiment

The ink composition according to the second embodiment of the present invention basically comprises at least a colorant, water, and a water-soluble organic solvent. The colorant comprises: a dye or a pigment; and a polymer covering the dye or the pigment and having, in its molecular chain, sites possessing ultraviolet absorbing activity and/or photostabilizing activity, the colorant being in the form of fine particles.

(a) Colorant

The colorant used in the ink composition according to the second embodiment of the present invention comprises a dye or a pigment covered in a specific polymer and is in the form of fine particles. According to the present invention, the polymer has, in its molecular chain, sites possessing ultraviolet absorbing activity and/or photostabilizing activity.

According to a preferred embodiment of the present invention, this polymer refers to a polymer or a copolymer using, as a component for polymerization, a monomer having a site possessing ultraviolet absorbing activity and/or photostabilizing activity, or a polymer with a site possessing ultraviolet absorbing activity and/or photostabilizing activity being grafted thereon.

According to a preferred embodiment of the present invention, the site possessing the ultraviolet absorbing activity and/or the photostabilizing activity is selected from the group consisting of aromatic monocyclic hydrocarbon, fused polycyclic aromatic hydrocarbon, heteromonocyclic, and fused heterocyclic groups, and has an absorbing activity in a wavelength region from 200 to 400 nm. Further, specific examples of sites possessing the ultraviolet absorbing activity and/or the photostabilizing activity include those having a benzotriazole, benzophenone, salicylate, cyanoacrylate, hindered phenol, or hindered amine skeleton, as described above in connection with the first embodiment of the present invention.

According to the present invention, the polymer having, in its molecular chain, sites possessing ultraviolet absorbing activity and/or photostabilizing activity may be a homopolymer produced by using, as a component for polymerization, a monomer having a site possessing ultraviolet absorbing activity and/or photostabilizing activity, or a copolymer produced by providing, as a component for polymerization, a monomer having a site possessing ultraviolet absorbing activity and/or photostabilizing activity and copolymerizing this monomer with other monomer. Alternatively, the polymer having, in its molecular chain, sites possessing ultraviolet absorbing activity and/or photostabilizing activity may be produced by graft polymerizing a site possessing ultraviolet absorbing activity and/or photostabilizing activity onto a polymer. Preferred monomers, having sites possessing ultraviolet absorbing activity and/or photostabilizing activity, usable in the above production process include monomers having a site possessing ultraviolet absorbing activity and/or photostabilizing activity and an ethylenically unsaturated bond. Specific examples of such monomers include benzotriazole ultraviolet absorbers having an ethylenically unsaturated bond, benzophenone ultraviolet absorbers having an ethylenically unsaturated bond, salicylate ultraviolet absorbers having an ethylenically unsaturated bond, cyanoacrylate ultraviolet absorbers having an ethylenically unsaturated bond, hindered phenol ultraviolet absorbers having an ethylenically unsaturated bond, and hindered amine photostabilizers having an ethylenically unsaturated bond. The ethylenically unsaturated bond in these monomers may be provided as a methacryloyl, acryloyl, vinyl, or allyl group.

Specific examples of such monomers include those described in connection with the first embodiment of the present invention, that is, include monomers having an ultraviolet absorbing site with a benzophenone skeleton, monomers having an ultraviolet absorbing site with a benzotriazole skeleton, monomers having an ultraviolet absorbing site with a hindered phenol skeleton, and monomers having a photostabilizing site with a hindered amine skeleton.

The monomer having a site possessing ultraviolet absorbing activity and/or photostabilizing activity may be a commercially available one. Examples thereof include: RUVA-93 (2-(2'-hydroxy-5-methylacryloxyethylphenyl)-2H-benzotriazole), available from Otsuka Chemical Co., Ltd., as the monomer having an ultraviolet absorbing site with a benzotriazole skeleton; and ADK STAB LA-82 (1,2,2,6,6-pentamethyl-4-piperidyl methacrylate) and ADK STAB LA-87 (2,2,6,6-tetramethyl-4-piperidyl methacrylate), available from Asahi Denka Kogyo Ltd., as the monomer having a photostabilizing site with a hindered amine skeleton.

Examples of other monomers, which may be copolymerized together with the above monomer include: vinyl esters, for example, acrylic esters or methacrylic esters, such as methyl (meth)acrylate, ethyl (meth)acrylate, isopropyl (meth)acrylate, n-butyl (meth)acrylate, isobutyl (meth)acrylate, n-amyl (meth)acrylate, isoamyl (meth)acrylate, n-hexyl (meth)acrylate, 2-ethylhexyl (meth)acrylate, octyl (meth) acrylate, decyl (meth)acrylate, dodecyl (meth)acrylate, octadecyl (meth)acrylate, cyclohexyl (meth)acrylate, phenyl (meth)acrylate, benzyl (meth)acrylate, 2-hydroxylethyl (meth)acrylate, hydroxypropyl (meth)acrylate, glycidyl methacrylate, and glycidyl acrylate, and vinyl acetate; acrylonitrile, methacrylonitrile and the like; aromatic vinyl compounds, such as styrene, 2-methylstyrene, vinyltoluene, t-butylstyrene, chlorostyrene, vinylanisole, vinylnaphthalene, and divinylbenzene; halogenated vinylidene, such as vinylidene chloride and vinylidene fluoride; ethylene, propylene, isopropylene, butadiene, vinylpyrrolidone, vinyl chloride, vinyl ether, vinyl ketone, chloroprene and the like, and carboxyl-containing compounds, for example, ethylenically unsaturated carboxylic acids, such as acrylic acid, methacrylic acid, maleic acid, or monoalkyl esters thereof, itaconic acid or monoalkyl esters thereof, fumaric acid or monoalkyl esters thereof; amido-containing compounds, such as acrylamide and N,N-dimethylacrylamide, and alkylamino esters of acrylic acid or methacrylic acid, for example, amino-containing compounds, such as N-methylaminoethyl methacrylate, N-methylaminoethyl acrylate, dimethylaminoethyl methacrylate, dimethylaminoethyl acrylate, diethylaminoethyl methacrylate, and diethylaminoethyl methacrylate; unsaturated amides containing an alkylamino group, such as N-(2-dimethylaminoethyl)acrylamide, N-(2-dimethylaminoethyl)methacrylamide, and N,N-dimethylaminopropylacrylamide, monovinylpyridines, such as vinylpyridine, and vinyl ethers containing an alkylamino group, such as dimethylaminoethyl vinyl ether; and vinylimidazole and the like and compounds containing a sulfonic group, such as vinylsulfonic acid, styrenesulfonic acid and salts thereof and 2-acryloylamino-2-methylpropanesulfonic acid and salts thereof. These monomers may be used alone or as a mixture of two or more. Copolymers prepared from these monomers include ethylene/vinyl acetate copolymer, ethylene/ethyl acrylate copolymer, polyethylene, polypropylene, polystyrene, poly(meth)acrylic ester, styrene/(meth)acrylic ester copolymer, styrene/maleic acid copolymer, styrene/itaconic ester copolymer, polyvinyl acetate, polyesters, polyurethane, and polyamides.

According to a preferred embodiment of the present invention, the polymer having, in its molecular chain, sites possessing ultraviolet absorbing activity and/or photostabilizing activity is preferably thermoplastic.

Polymers with a monomer having a site possessing ultraviolet absorbing activity and/or photostabilizing activity grafted thereon include homopolymers and copolymers of the above monomers.

According to the present invention, a colorant in the form of fine particles is obtained wherein the above polymer covers a dye or a pigment. According to a preferred embodiment of the present invention, the colorant in the form of fine particles may be produced, for example, by a method wherein a dye or a pigment is mixed in a polymer, a microcapsulation method wherein a dye or a pigment is encapsulated with a polymer, a method wherein a dye or a pigment is dissolved in a monomer followed by emulsion polymerization, or a microemulsification.

The method, wherein a dye or a pigment is encapsulated with a polymer, may be carried out by interfacial polymerization, in-situ polymerication, coacervation, submerged drying, melting dispersion-cooling, spray drying, submerged curing/coating. More specifically, the encapsulation of the dye or the pigment with the polymer may be carried by a method for preparing fine particles of a colored resin comprising a dye or a pigment covered by a polymer, disclosed in Japanese Patent Laid-Open Nos. 279073/1997, 176130/1998, and 239392/1993.

Preferably, the colorant according to the present invention is produced by emulsion polymerization. Specifically, the emulsion polymerization is carried out by dissolving or dispersing a dye or a pigment in a monomer component for constituting the polymer and subjecting the solution or dispersion and a monomer having a site possessing ultraviolet absorbing activity or photostabilizing activity to emulsion polymerization in water in the presence of a polymerization catalyst and an emulsifier.

According to a preferred embodiment of the present invention, the colorant has, as a functional group, any of carboxyl and sulfonic acid groups. Further, those having an amido, hydroxyl, or amino group are preferred. In the above production process, these groups may be introduced into the structure of the monomer, or alternatively may be added onto the surface of fine particles, for example, by graft polymerization after the formation of the fine particles.

According to a preferred embodiment of the present invention, the particle diameter of the colorant is preferably as small as about 5 to 500 nm, more preferably about 50 to 200 nm.

The content of the colorant in the ink composition according to the present invention is preferably about 1 to 20% by weight, more preferably 1 to 10%. When the amount of the colorant added is in the above range, good ejection stability is provided in ink jet recording.

The coloring component contained in the colorant according to the present invention may be either a dye or a pigment.

Dyes usable herein include various dyes, such as oil-soluble dyes, direct dyes, acid dyes, foodstuff dyes, basic dyes, reactive dyes, disperse dyes, vat dyes, soluble vat dyes, and reactive disperse dyes. Among them, oil-soluble dyes and disperse dyes are particularly preferred.

Regarding the pigment, inorganic and organic pigments are usable. Examples of the inorganic pigment include carbon blacks produced by known processes, such as contact, furnace, and thermal processes. Examples of the organic pigment include azo pigments (including azo lake, insoluble azo pigment, fused azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

Specific examples of carbon blacks, yellow pigments, magenta pigments, and cyan pigments include those described above in connection with the first embodiment of the present invention.

The particle diameter of the pigment is preferably not more than 500 nm, more preferably not more than 200 nm.

The content of the dye or the pigment in the colorant according to the present invention may be properly determined so far as the color development is not sacrificed. The content of the dye or the pigment in the colorant, however, is preferably about 0.1 to 99% by weight, more preferably 5 to 90% by weight.

The ink composition according to the present invention may contain other dye and/or pigment in addition to the above colorant. In particular, a combination thereof with a colorant having a film-forming property described below can advantageously realize images possessing better color development, waterfastness, rubbing/scratch resistance, and lightfastness.

According to a preferred embodiment of the present invention, the polymer covering the dye or the pigment has a film-forming property. According to a preferred embodiment of the present invention, this polymer, when it is in the form of the colorant, has a glass transition point of 30° C. or below. In this case, the term "minimum film-forming temperature" used herein refers to a minimum temperature at which, when the colorant dispersed in water is thinly cast onto a sheet of a metal, such as aluminum, to form a coating which is then gradually heated, a continuous film is formed. According to this embodiment, the ink composition can surely form a film at room temperature. As a result, it is possible to improve fast drying, drying to the touch, rubbing/scratch resistance, and waterfastness of prints.

According to another aspect of the present invention, the colorant per se constitutes an invention. That is, according to another aspect of the present invention, there is provided a colorant comprising: a dye or a pigment; and a polymer covering the dye or the pigment and having, in its molecular chain, sites possessing ultraviolet absorbing activity and/or photostabilizing activity, the colorant being in the form of fine particles.

(b) Water-soluble Organic Solvent

The ink composition according to the second embodiment of the present invention comprises a water-soluble organic solvent. This water-soluble organic solvent is preferably a high-boiling organic solvent. Preferred examples of high-boiling organic solvents usable herein include polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; and 1,3-dimethyl-2-imidazolidinone.

The amount thereof added may be properly determined. The amount, however, is preferably about 0.1 to 30% by weight, more preferably 1 to 10% by weight, based on the ink.

According to a preferred embodiment of the present invention, in addition to the high-boiling organic solvent, a low-boiling organic solvent may be added to the ink composition from the viewpoint of shortening the drying time of printed images produced from the ink composition. Examples of preferred low-boiling organic solvents include methanol, ethanol, n-propyl alcohol, iso-propyl alcohol, n-butanol, sec-butanol, tert-butanol, iso-butanol, and n-pentanol. Monohydric alcohols are particularly preferred. Although the amount of the low-boiling organic solvent added may be properly determined, it is preferably in the range of 0.1 to 30% by weight, more preferably in the range of 5 to 10% by weight.

According to a preferred embodiment of the present invention, when the colorant comprises a dye and a polymer covering the dye with the polymer having a glass transition point of 30° C. or below or when the minimum film-forming temperature of the emulsion produced by dispersing the colorant in water is 30° C. or below, the use of a water-soluble organic solvent having a boiling point of 180° C. or above is preferred. Preferred examples of the water-soluble organic solvent include ethylene glycol (b.p.: 197° C.; the boiling point being hereinafter described within parentheses), propylene glycol (187° C.), diethylene glycol (245° C.), pentamethylene glycol (242° C.), trimethylene glycol (214° C.), 2-butene-1,4-diol (235° C.), 2-ethyl-1,3-hexanediol (243° C.), 2-methyl-2,4-pentanediol (197° C.), N-methyl-2-pyrrolidone (202° C.), 1,3-dimethyl-2-imidazolidinone (257–260° C.), 2-pyrrolidone (245° C.), glycerin (290° C.), tripropylene glycol monomethyl ether (243° C.), dipropylene glycol monoethyl glycol (198° C.), dipropylene glycol monomethyl ether (190° C.), dipropylene glycol (232° C.), triethylene glycol monomethyl ether (249° C.), tetraethylene glycol (327° C.), triethylene glycol (288° C.), diethylene glycol monobutyl ether (230° C.), diethylene glycol monoethyl ether (202° C.), and diethylene glycol monomethyl ether (194° C.). According to a preferred embodiment of the present invention, a solvent selected from, for example, ethylene glycol, diethylene glycol, pentamethylene glycol, trimethylene glycol, 2-butene-1,4-diol, 2-ethyl-1,3-hexanediol, 2-methyl-2,4-pentanediol glycerin, dipropylene glycol, tetraethylene glycol, triethylene glycol, N-methyl-2-pyrrolidone, 1,3-dimethyl-2-imidazolidinone, and 2-pyrrolidone, is used as the high-boiling, water-soluble solvent.

(c) Other Ingredients

The ink composition according to the second embodiment of the present invention preferably contains a saccharide, a tertiary amine, an alkali hydroxide, or ammonia. The addition of these compounds can provide an ink composition which causes neither agglomeration of the colorant nor an increase in viscosity of the colorant even after storage for a long period of time, that is, possesses excellent storage stability, and, even when allowed to stand in an open state (that is, when allowed to stand in contact with air at room temperature), can maintain the fluidity and the redispersibility for a long period of time, and, in addition, does not cause clogging of nozzles during printing or at the time of restarting after interruption of printing, thus offering high ejection stability.

Saccharides, which may be added to the ink composition according to the present invention, include monosaccharides, disaccharides, oligosaccharides (including trisaccharides and tetrasaccharides), and polysaccharides, and preferred examples thereof include glucose, mannose, fructose, ribose, xylose, arabinose, galactose, aldonic acid, glucitol, sorbit, maltose, cellobiose, lactose, sucrose, trehalose, and maltotriose. The polysaccharides refer to saccharides in a wide sense and embrace materials which widely exist in the natural world, such as alginic acid, α-cyclodextrin, and cellulose. Derivatives of these saccharides include reducing sugars of the above saccharides (for example, sugar alcohols represented by the general formula $HOCH_2(CHOH)_n CH_2OH$ wherein n is an integer of 2 to 5), oxidized sugars (for example, aldonic acid and uronic acid), amino acid, and thiosugars. Sugar alcohols are particularly preferred, and specific examples thereof include maltitol and sorbit.

The content of the saccharide is preferably about 0.1 to 40% by weight, more preferably 1 to 30% by weight, based on the ink.

Examples of tertiary amines, which may be added to the ink composition according to the present invention, include trimethylamine, triethylamine, triethanolamine, dimethylethanolamine, diethylethanolamine, triisopropenolamine, and butyldiethanolamine. They may be used alone or in combination of two or more. The amount of the tertiary amine added to the ink composition according to the present invention is preferably about 0.1 to 10% by weight, more preferably 0.5 to 5% by weight.

Examples of alkali hydroxides, which may be added to the ink composition of the present invention, include potassium hydroxide, sodium hydroxide, and lithium hydroxide, and the amount of the alkali hydroxide added to the ink composition according to the present invention is 0.01 to 5% by weight, preferably 0.05 to 3% by weight.

The ink composition according to the present invention may further comprise a surfactant. Examples of surfactants usable herein include anionic surfactants (for example, sodium dodecylbenzenesulfonate, sodium laurylate, and an ammonium salt of polyoxyethylene alkyl ether sulfates), nonionic surfactants (for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides), and acetylene glycol (OLFINE Y and Surfynol 82, 104, 440, 465, and 485 (all the above products being manufactured by Air Products and Chemicals Inc.). They may be used alone or in combination of two or more.

According to a preferred embodiment of the present invention, the ink composition according to the second embodiment may contain, in addition to the above colorant, an additional colorant. The additional colorant is preferably a dye or a pigment. Dyes usable herein include various dyes, such as direct dyes, acid dyes, foodstuff dyes, reactive dyes, disperse dyes, vat dyes, soluble vat dyes, and reactive disperse dyes. Regarding the pigment, inorganic and organic pigments are usable. Examples of the inorganic pigment include carbon blacks produced by known processes, such as contact, furnace, and thermal processes. It is also possible to use surface treated carbon blacks wherein the surface of carbon blacks has been treated by oxidation or the like. Examples of the organic pigment include azo pigments (including azo lake, insoluble azo pigment, fused azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black. The particle diameter of the pigment is preferably not more than 10 μm, more preferably not more than 0.1 μm.

The content of the additional colorant in the ink composition according to the second embodiment of the present invention is preferably about 1 to 20% by weight, more preferably 1 to 10% by weight, based on the ink composition.

If necessary, pH adjusters, preservatives, antimolds, phosphorus antioxidants and the like may be contained in the ink composition according to the second embodiment of the present invention.

Ink Jet Recording Method

As described above, the ink composition of the present invention is preferably used for ink jet recording. Further, the ink composition of the present invention may be preferably used for color ink jet recording using a plurality of color ink compositions. The color ink jet recording will be described with reference to the accompanying drawings.

FIG. 1 is a diagram showing an embodiment of an ink jet recording apparatus. In this embodiment, an ink composition is stored in a tank and fed into a recording head through an ink tube. Specifically, a recording head 1 is communicated with an ink tank 2 through an ink tube 3. In this case, the interior of the ink tank 2 is partitioned, and a chamber for an ink composition, optionally a plurality of chambers respectively for a plurality of color ink compositions, are provided.

The recording head 1 is moved along a carriage 4 by means of a timing belt 6 driven by a motor 5. On the other hand, paper 7 as a recording medium is placed by a platen 8 and a guide 9 at a position facing the recording head 1. In this embodiment, a cap 10 is provided. A suction pump 11 is connected to the cap 10 in order to conduct the so-called "cleaning operation." The sucked ink composition is resorvoired in a waste ink tank 13 through a tube 12.

Figure 2:
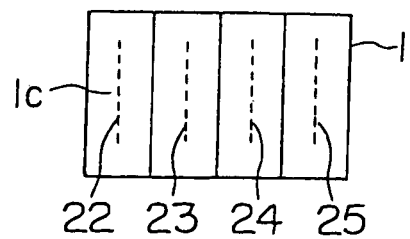
FIG. 2 is an enlarged view showing the surface of nozzles for a recording head, wherein reference character 1c designates the surface of a plurality of nozzles, arranged in longitudinal direction, through which an ink composition is ejected.

FIG. 2 is an enlarged view showing the surface of nozzles for the recording head 1. In the drawing, the surface of nozzles for the ink composition is indicated by 1c, and a yellow ink composition, a magenta ink composition, a cyan ink composition, and a black ink composition are ejected respectively through nozzles 22, 23, 24 and 25.

Figure 3:
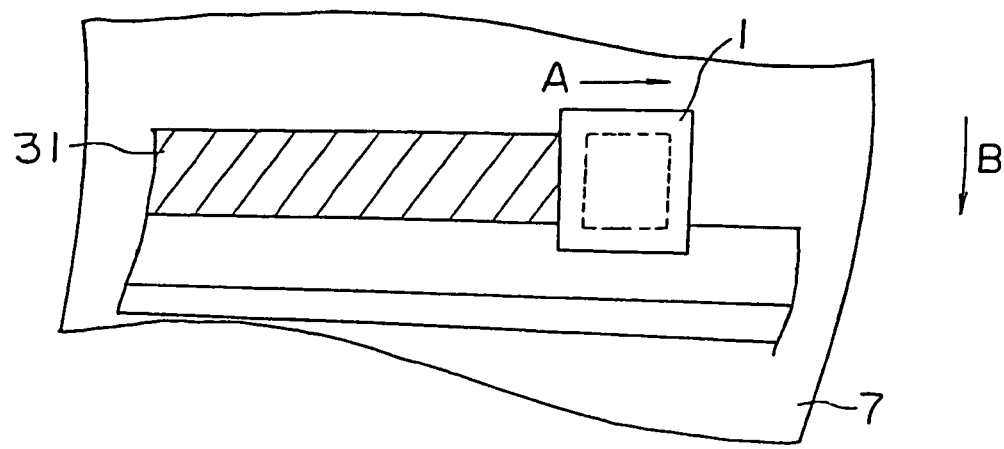
FIG. 3 is a diagram illustrating ink jet recording using the recording head shown in FIG. 2, wherein numeral 31 designates an ink composition printed region.

Further, an ink jet recording method using the recording head shown in FIG. 2 will be described with reference to FIG. 3. The recording head 1 is moved in the direction indicated by an arrow A, during which time the ink composition is printed to form a print region 31.

In the ink jet recording apparatus, the supplement of the ink composition may be carried out by replacing a cartridge as the ink tank. The ink tank may be integral with the recording head.

Figure 4:
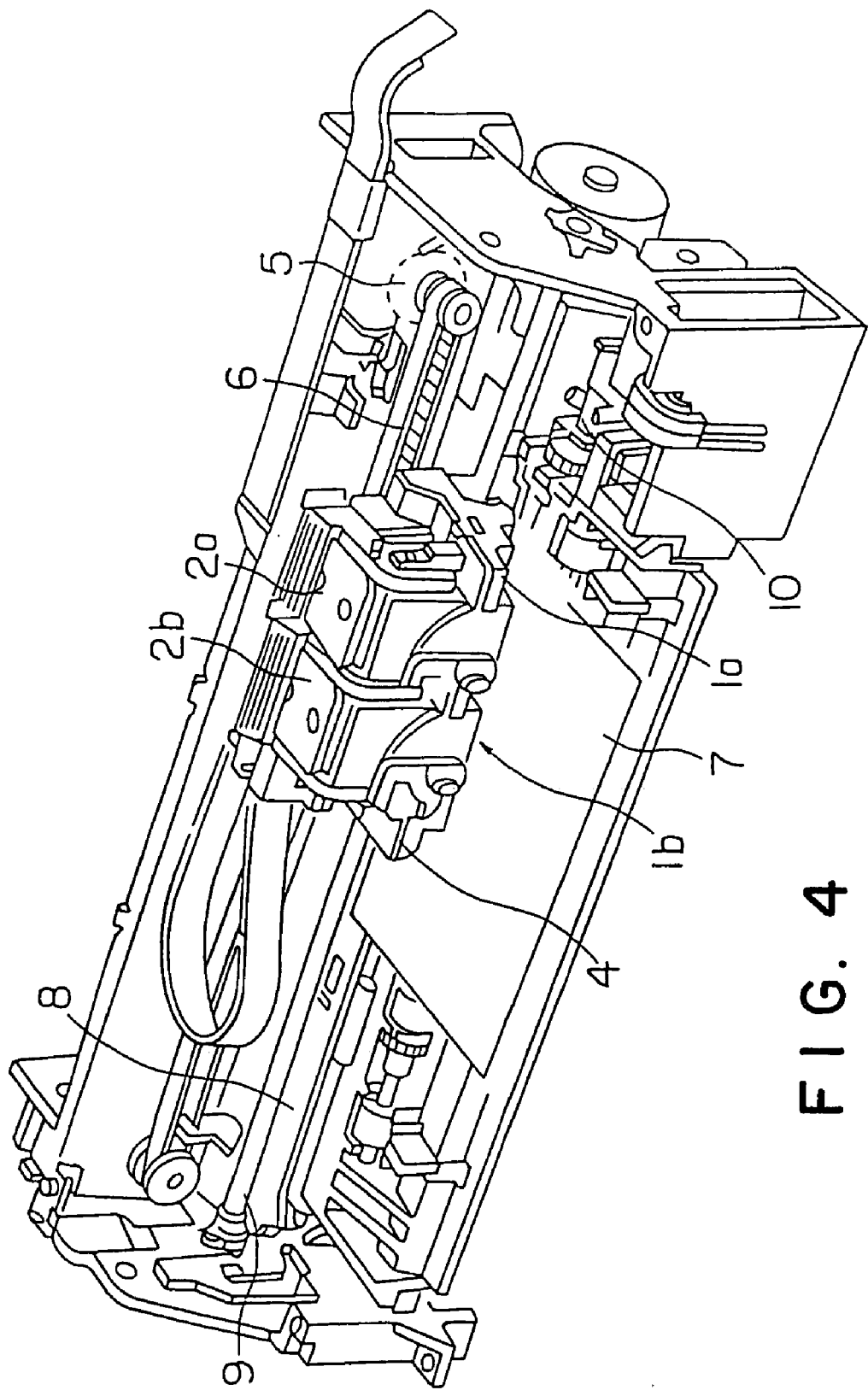
FIG. 4 is a diagram showing an ink jet recording apparatus, wherein a recording head is integral with an ink tank.

A preferred embodiment of an ink jet recording apparatus using such an ink tank is shown in FIG. 4. In the drawing, the same members as used in the apparatus shown in FIG. 1 have the same reference numerals. In the embodiment shown in FIG. 4, a recording head 1 is integral with an ink tank 2. Basically, printing may be conducted in the same manner as described above in connection with the apparatus shown in FIG. 1. Further, in this embodiment, the recording head 1 is moved together with the ink tank 2 on a carriage 4.

EXAMPLES

Example A

Preparation of Polymer A1

Styrene (30 g), 20 g of 2-(2'-hydroxy-5-methylacryloxyethylphenyl)-2H-benzotriazole (RUVA-93, manufactured by Otsuka Chemical Co., Ltd.) as a monomer having ultraviolet absorbing activity, 50 g of methacrylic acid, and 2 g of α, α'-azobisisobutyronitrile (AIBN) as a polymerization initiator were dissolved in 200 g of toluene. The mixture was deaerated, and a reaction was then allowed to proceed at 60° C. while replacing the air in the system by nitrogen. After the completion of the reaction, the reaction mixture was cooled. The resultant polymer was then precipitated from methanol, and collected by filtration to prepare a polymer powder. The polymer powder was then neutralized with potassium hydroxide in deionized water to prepare a transparent aqueous solution. The molecular weight of the polymer was measured by GPC, and found to be 7,000.

Preparation of Polymer A2

Styrene (50 g), 50 g of methacrylic acid and 2 g of α, α'-azobisisobutyronitrile (AIBN) as a polymerization initiator were dissolved in 200 g of toluene. The mixture was deaerated, and a reaction was then allowed to proceed at 60° C. while replacing the air in the system by nitrogen. After the completion of the reaction, the reaction mixture was cooled. The resultant polymer was then precipitated from methanol, and collected by filtration to prepare a polymer powder. The polymer powder was then neutralized with potassium hydroxide in deionized water to prepare a transparent aqueous solution. The molecular weight of the polymer was measured by GPC, and found to be 7,000.

Polymer Emulsion A1

Distilled water (200 ml) and 0.6 g of sodium dodecylbenzenesulfonate were charged into a reactor equipped with an agitator, a reflux condenser, a dropping device, a thermometer, and a nitrogen inlet tube, and the temperature was raised to 70° C. under agitation in a nitrogen atmosphere. Potassium persulfate (2 g) was further added thereto. Separately, 40 g of butyl acrylate, 50 g of styrene, 5 g of acrylic acid, and 0.10 g of t-dodecylmercaptan were mixed together to prepare a solution which was then added dropwise to the reactor. The mixture was allowed to react at 70° C. for additional 6 hr and then cooled to room temperature. Aqueous ammonia was added as a neutralizing agent to adjust pH, followed by filtration through a 10-μm filter to prepare a polymer emulsion containing fine particles of a polymer as dispersed particles.

Measurement of Glass Transition Point (Tg) of Polymer Emulsion

Water contained in the polymer emulsion was evaporated to form a film of which the glass transition point was measured with a differential scanning calorimeter (DSC) at a temperature rise rate of 10° C./min.

Measurement of Minimum Film-forming Temperature (MFT)

A sample plate made of aluminum was mounted on a minimum film-forming temperature measuring apparatus was set. When the temperature gradient of the ton surface of the sample plate reached equilibrium, the polymer emulsion as a sample was thinly spread on the sample plate and dried. When the sample plate was visually inspected after the completion of drying, a transparent, continuous film was formed in a temperature region above the minimum film-forming temperature, while a white powder was formed in a temperature region below the minimum film-forming temperature. The temperature of the boundary between the temperature at which the transparent, continuous film was formed and the temperature at which the white powder was formed was measured as the minimum film-forming temperature.

| Preparation of inks | |
|---|---|
| Yellow ink A1 | |
| C.I. Pigment Yellow 93 | 3 wt % |
| Polymer A1 | 2 wt % |
| Glycerin | 10 wt % |
| Triethanolamine | 1 wt % |
| KOH | 0.1 wt % |
| Pure water | Balance |
| Yellow ink A2 | |
| C.I. Pigment Yellow 93 | 3 wt % |
| Polymer A1 | 2 wt % |
| Glycerin | 10 wt % |
| Maltitol | 7 wt % |
| 2-Pyrrolidone | 2 wt % |
| Triethanolamine | 1 wt % |
| KOH | 0.1 wt % |
| Pure water | Balance |
| Yellow ink A3 | |
| C.I. Pigment Yellow 93 | 3 wt % |
| Polymer A1 | 2 wt % |
| Polymer emulsion 1 | 3 wt % |
| Glycerin | 10 wt % |
| Maltitol | 7 wt % |
| 2-Pyrrolidone | 2 wt % |
| Triethanolamine | 1 wt % |
| KOH | 0.1 wt % |
| Pure water | Balance |
| Yellow ink A4 | |
| C.I. Pigment Yellow 93 | 3 wt % |
| Polymer A2 | 2 wt % |
| Glycerin | 10 wt % |
| Triethanolamine | 1 wt % |
| KOH | 0.1 wt % |
| Pure water | Balance |
| Yellow ink A5 | |
| C.I. Pigment Yellow 93 | 3 wt % |
| Polymer A2 | 2 wt % |
| Glycerin | 10 wt % |
| Maltitol | 7 wt % |
| 2-Pyrrolidone | 2 wt % |
| Triethanolamine | 1 wt % |
| KOH | 0.1 wt % |
| Pure water | Balance |
| Yellow ink A6 | |
| C.I. Pigment Yellow 93 | 3 wt % |
| Polymer A2 | 2 wt % |
| Polymer emulsion 1 | 3 wt % |
| Glycerin | 10 wt % |
| Maltitol | 7 wt % |
| 2-Pyrrolidone | 2 wt % |
| Triethanolamine | 1 wt % |
| KOH | 0.1 wt % |
| Pure water | Balance |

Evaluation Test

Evaluation A1: Lightfastness

For each of yellow inks A1 to A6, a blotted image of 3 cm×3 cm was printed (100% duty) on plain papers, i.e., Xerox 4024 and Xerox P, and a specialty paper for ink jet recording (manufactured by Seiko Epson Corporation) by means of an ink jet printer MJ 8000C (manufactured by Seiko Epson Corporation).

The blotted images thus obtained were subjected to a 600-hr exposure test using a xenon fadeometer. In this case, for the blotted image area, the color before exposure and the color after exposure were measured with a Macbeth CE-7000 spectrophotometer (manufactured by Macbeth) and expressed in terms of the L*a*b* color system of the color difference indication method specified in CIE (Commission International de l'Eclairage), and a change in color between before the exposure and after the exposure in the blotted image area was expressed in terms of the color difference determined by the following equation.

Color difference:

$$\Delta E^*_{ab}=[(\Delta L^*)^2+(\Delta a^*)^2+(\Delta b^*)^2]^{1/2}$$

The results were evaluated according to the following criteria.

A: $\Delta E^*ab \leq 10$
B: $10 < \Delta E^*_{ab} \leq 20$
C: $\Delta E^*_{ab} > 20$ Further, for the blotted image area, the color density before the exposure and the color density after the exposure were measured with a Macbeth densitometer TR927 (manufactured by Macbeth), and a change in color density between before and after the exposure in the blotted image area was determined. The results were evaluated according to the following criteria.

A: OD value change of not more than 5%
B: OD value change of more than 5 to less than 10%
C: OD value change of not less than 10%

Evaluation A2: Rubbing/Scratch Resistance Test (Line Marking Resistance)

The records prepared in the evaluation 1 were dried at room temperature for 24 hr, and the printed characters in the records were then rubbed with a water-base fluorescent marker pen (ZEBRA PEN 2 (trademark)) manufactured by ZEBRA at a marking force of $4.9 \times 10^5$ N/m$^2$ and visually inspected for staining. The results were evaluated according to the following criteria.

A: No stain was created by marking twice.
B: Stain was created by marking once.

The results of evaluation were as summarized in the following table.

| Yellow ink | Lightfastness | | Rubbing/scratch resistance |
| --- | --- | --- | --- |
| | Color difference | OD value | |
| A1 | A | A | B |
| A2 | A | A | B |
| A3 | A | A | A |
| A4 | C | C | B |
| A5 | C | C | B |
| A6 | C | C | A |

Example B

Preparation of Colorants Colorant B1

Styrene (50 g), 40 g of butyl acrylate, and 5 g of methacrylic acid were mixed together to prepare a solution. Further, 10 g of 2-(2'-hydroxy-5'-methacryloxyethylphenyl)-2H-benzotriazole (RUVA-93, manufactured by Otsuka Chemical Co., Ltd.) as a monomer having a skeleton having ultraviolet absorbing activity and 1 g of 1,2,2,6,6-pentamethyl-4-piperidyl methacrylate (ADK STAB LA-82, manufactured by Asahi Denka Kogyo Ltd.) as a monomer having a skeleton possessing photopolymerizing activity were added to and dissolved in the solution. C.I. Solvent Red 63 was added to and dissolved in the mixed solution. Distilled water (100 ml), 2 g of a sodium salt of 2-sulfoethyl methacrylate, and 0.1 g of sodium dodecylbenzenesulfonate were then added thereto. The mixture was stirred at a high speed by means of a homogenizer to perform emulsification. Thus, a monomer solution containing a dye was prepared.

Distilled water (200 ml) and 0.1 g of sodium dodecylbenzenesulfonate were charged into a reactor equipped with an agitator, a reflux condenser, a dropping device, a thermometer, and a nitrogen inlet tube, and the temperature was raised to 70° C. under agitation in a nitrogen atmosphere. Potassium persulfate (2 g) was further added thereto.

The monomer solution containing a dye was gradually added dropwise to the reactor, and a reaction was then allowed to proceed at 70° C. for 5 hr. The reaction mixture was then cooled to room temperature, and adjusted to pH 8 by the addition of an aqueous ammonia solution. Thereafter, the solution was filtered through a 0.2-μm filter to prepare fine particles of a colorant wherein the dye was covered by a polymer having, in its molecular chain, sites possessing ultraviolet absorbing activity and photostabilizing activity.

The colorant thus obtained had a glass transition point of 20° C., and had a particle diameter of not more than 200 nm as measured with a particle size distribution meter.

Colorant B2

C.I. Solvent Red 60 (60 g), 90 g of styrene, and 12 g acrylic acid were placed in a beaker. 2-(2'-Hydroxy-5'-methacryloxyethylphenyl)-2H-benzotriazole (RUVA-93, manufactured by Otsuka Chemical Co., Ltd.) as a monomer having a skeleton possessing ultraviolet absorbing activity (18 g) was added thereto. The mixture was stirred at 40° C. to dissolve the contents in one another to prepare an oil phase of the monomer. Separately, 90 g of a 20% solution of Poval 600 (manufactured by Nippon Synthetic Chemical Industry Co., Ltd.), 180 g of distilled water, 18 g of ZONTES AL-12 (manufactured by Matsumoto Yushi Seiyaku Co., Ltd.) as a nonionic surfactant, and 0.3 g of BPO (manufactured by Wako Pure Chemical Industries, Ltd.) as a polymerization initiator were placed in a beaker, followed by mixing while stirring to prepare an aqueous phase of a Poval solution. The oil phase and the aqueous phase were mixed together in a 1,000-cc beaker, and the mixture was stirred at a high speed by means of an emulsifier to prepare an emulsion. The emulsion thus obtained was placed in a reactor equipped with an agitator, a thermometer, and a reflux condenser. Distilled water (200 g) was added thereto. The temperature was then raised to 40 to 50° C. under agitation while replacing the air in the reactor by nitrogen, and a reaction was allowed to proceed for 5 hr. Thereafter, the solution was filtered through a 0.2-μm filter to prepare fine particles of a colorant wherein the dye was covered by a polymer having, in its molecular chain, sites possessing ultraviolet absorbing activity.

Colorant B3

C.I. Pigment Yellow 13 (30 g), 20 g of butyl acrylate, 30 g of benzyl methacrylate, 12 g of methacrylic acid, and 18 g of 2-(2'-hydroxy-5'-methacryloxyethylphenyl)-2H-benzotriazole (RUVA-93, manufactured by Otsuka Chemical Co., Ltd.) as a monomer having a skeleton having ultraviolet absorbing activity were stirred at 40° C. to prepare a liquid A. Separately, 90 g of a 20% solution of Poval 600 (manufactured by Nippon Synthetic Chemical Industry Co., Ltd.), 200 g of distilled water, 18 g of ZONTES AL-12 (manufactured by Matsumoto Yushi Seiyaku Co., Ltd.) as a nonionic surfactant, and 1.0 g of potassium persulfate were mixed while stirring at room temperature to prepare a liquid B. The liquid A and the liquid B were mixed together. The mixture was then stirred at a high speed by means of an emulsifier to prepare an emulsion. The emulsion was then charged into a reactor equipped with an agitator, a thermometer, and a reflux condenser. Distilled water (200 g) was added thereto. The temperature was then raised to 70° C. under agitation while replacing the air in the reactor by nitrogen, and a reaction was allowed to proceed for 5 hr. Thereafter, the solution was filtered through a 0.2-μm filter to prepare fine particles of a colorant wherein the pigment was covered by a polymer having, in its molecular chain, sites possessing ultraviolet absorbing activity.

Ink Compositions

Ink compositions containing the colorants prepared above were prepared according to the following formulations. For comparison, an ink composition was prepared wherein the dye used in the colorant B2 was added without inclusion of the dye in the polymer.

Ink B1

| | |
|---|---|
| Colorant B1 | 5 wt % |
| Triethylene glycol monobutyl ether | 10 wt % |
| Glycerin | 10 wt % |
| Potassium hydroxide | 0.1 wt % |
| Pure water | Balance |

Ink B2

| | |
|---|---|
| Colorant B2 | 5 wt % |
| Triethylene glycol monobutyl ether | 10 wt % |
| Glycerin | 10 wt % |
| Potassium hydroxide | 0.1 wt % |
| Pure water | Balance |

Ink B3

| | |
|---|---|
| Colorant B1 | 5 wt % |
| Diethylene glycol monobutyl ether | 10 wt % |
| Glycerin | 10 wt % |
| Olfine STG (Nissin Chemical Industry Co., Ltd.) | 0.8 wt % |
| Potassium hydroxide | 0.1 wt % |
| Triethanolamine | 0.5 wt % |
| Pure water | Balance |

Ink B4

| | |
|---|---|
| Colorant B2 | 5 wt % |
| Diethylene glycol monobutyl ether | 10 wt % |
| Glycerin | 10 wt % |
| Olfine STG (liissin Chemical Industry Co., Ltd.) | 0.8 wt % |
| Potassium hydroxide | 0.1 wt % |
| Triethanolamine | 0.5 wt % |
| Pure water | Balance |

Ink B5

| | |
|---|---|
| Colorant B2 | 5 wt % |
| Diethylene glycol monobutyl ether | 10 wt % |
| Glycerin | 10 wt % |
| Potassium hydroxide | 0.1 wt % |
| Pure water | Balance |

Ink B6

| | |
|---|---|
| Colorant B3 | 5 wt % |
| Triethylene glycol monobutyl ether | 10 wt % |
| Glycerin | 10 wt % |
| Potassium hydroxide | 0.1 wt % |
| Pure water | Balance |

Ink B7

| | |
|---|---|
| Colorant B3 | 5 wt % |
| Diethylene glycol monobutyl ether | 10 wt % |
| Glycerin | 10 wt % |
| Olfine STG (Nissin Chemical Industry Co., Ltd.) | 0.8 wt % |
| Potassium hydroxide | 0.1 wt % |
| Pure water | Balance |

Ink B8

| | |
|---|---|
| C.I. Direct Red 16 | 5 wt % |
| Diethylene glycol monobutyl ether | 10 wt % |
| Glycerin | 10 wt % |
| Olfine STG (Nissin Chemical Industry Co., Ltd.) | 0.8 wt % |
| Potassium hydroxide | 0.1 wt % |
| Triethanolamine | 0.5 wt % |
| Pure water | Balance |

Evaluation Test

Evaluation B1: Lightfastness Test 1

For each of inks B1 to B8, a blotted image of 3 cm×3 cm was printed (100% duty) on plain paper, i.e., Xerox P, and a specialty paper for ink jet recording (manufactured by Seiko Epson Corporation) by means of an ink jet recording apparatus shown in FIG. 1.

The records thus obtained were subjected to a 300-hr exposure test (at 0.25 W/m$^2$) using a xenon fadeometer. In this case, for the blotted image area, the color before exposure and the color after exposure were measured with a Macbeth CE-7000 spectrophotometer (manufactured by Macbeth) and expressed in terms of the L*a*b* color system of the color difference indication method specified in CIE (Commission International de l'Eclairage), and a change in color between before the exposure and after the exposure in the blotted image area was expressed in terms of the color difference determined by the following equation.

Color Difference:

$$\Delta E^*_{ab} = [(\Delta L^*)^2 + (\Delta a^*)^2 + (\Delta b^*)^2]^{1/2}$$

The results were evaluated according to the following criteria.

A: $\Delta E^*_{ab} \leq 10$
B: $10 < \Delta E^*_{ab} \leq 20$
C: $\Delta E^*_{ab} > 20$ Evaluation B2: Lightfastness Test 2

For the blotted images formed in the evaluation test 1, the color density before the exposure and the color density after the exposure were measured with a Macbeth densitometer TR927 (manufactured by Macbeth), and a change in color density between before and after the exposure in the blotted image area was determined. The results were evaluated according to the following criteria.

A: OD value change of not more than 5%
B: OD value change of more than 5 to less than 10%
C: OD value change of not less than 10%

Evaluation B3: Waterfastness

Blotted images were formed in the same manner as described above in connection with the evaluation test B1. The records thus obtained were then immersed in water for 30 sec. The records were then pulled up, and then dried under natural environment. For the blotted image area, the color before the immersion and the color after the immersion were measured in the same manner as described above in connection with the evaluation test 1 to determine the color difference.

A: $\Delta E^*_{ab} \leq 10$
B: $\Delta E^*_{ab} > 10$

Evaluation B4: Rubbing/Scratch Resistance

Blotted images were formed in the same manner as described above in connection with the evaluation test 1.

The records thus obtained were then dried at room temperature for 24 hr, and the dried records were rubbed with a water-base fluorescent marker pen (ZEBRA PEN 2 (tradename)) manufactured by ZEBRA at a marking force of $4.9 \times 10^5$ N/m² and visually inspected for staining. The results were evaluated according to the following criteria.

A: No stain was created by marking twice.

B: Stain was created by marking once.

The results of evaluation were as summarized in the following table.

| Ink | Lightfastness | | Waterfastness | Rubbing/scratch resistance |
| --- | --- | --- | --- | --- |
| | Color difference | OD value | | |
| B1 | A | A | A | A |
| B2 | A | A | A | A |
| B3 | A | A | A | A |
| B4 | A | A | A | — |
| B5 | A | A | A | — |
| B6 | A | A | A | A |
| B7 | A | A | A | A |
| B8 | C | C | B | B |

Example C

Colorant C1

Styrene (50 g), 40 g of butyl acrylate, and 5 g of methacrylic acid were mixed together to prepare a solution. Further, 10 g of 2-(2'-hydroxy-5'-methacryloxyethylphenyl)-2H-benzotriazole (RUVA-93, manufactured by Otsuka Chemical Co., Ltd.) as a monomer having a skeleton possessing ultraviolet absorbing activity and 1 g of 1,2,2,6,6-pentamethyl-4-piperidyl methacrylate (ADK STAB LA-82, manufactured by Asahi Denka Kogyo Ltd.) as a monomer having a skeleton possessing photopolymerizing activity were added to and dissolved in the solution with stirring. C.I. Solvent Black 11 was added to and dissolved in the mixed solution. Distilled water (100 ml), 2 g of a sodium salt of 2-sulfoethyl methacrylate, and 0.1 g of sodium dodecylbenzenesulfonate were then added thereto. The mixture was stirred at a high speed by means of a homogenizer to perform emulsification. Thus, a monomer solution containing a dye was prepared.

Distilled water (200 ml) and 0.1 g of sodium dodecylbenzenesulfonate were charged into a reactor equipped with an agitator, a reflux condenser, a dropping device, a thermometer, and a nitrogen inlet tube, and the temperature was raised to 70° C. under agitation in a nitrogen atmosphere. Potassium persulfate (2 g) was further added thereto.

The monomer solution containing a dye was gradually added dropwise to the reactor, and a reaction was then allowed to proceed at 70° C. for 5 hr. The reaction mixture was then cooled to room temperature, and adjusted to pH 8.2 by the addition of an aqueous ammonia solution. Thereafter, the solution was filtered through a 0.2-μm filter to prepare second fine particles of a colorant wherein the dye was covered by a polymer having, in its molecular chain, sites possessing ultraviolet absorbing activity and photostabilizing activity.

The colorant thus obtained had a glass transition point of 20° C., and had a particle diameter of not more than 200 nm as measured with a particle size distribution meter.

Colorant C2

Colorant C2 was prepared in the same manner as used in the preparation of colorant C1, except that C.I. solvent Yellow 12 was used instead of the dye C.I. Solvent Black 11.

Colorant C3

Colorant C3 was prepared in the same manner as used in the preparation of colorant C1, except that neither 2-(2'-hydroxy-5'-methacryloxyethylphenyl)-2H-benzo-triazole as the monomer having a skeleton possessing ultraviolet absorbing activity nor 1,2,2,6,6-pentamethyl-4-piperidyl methacrylate as the monomer having a skeleton possessing photostabilizing activity was added.

Colorant C4

Colorant C4 was prepared in the same manner as used in the preparation of colorant C2, except that neither 2-(2'-hydroxy-5'-methacryloxyethylphenyl)-2H-benzo-triazole as the monomer having a skeleton possessing ultraviolet absorbing activity nor 1,2,2,6,6-pentamethyl-4-piperidyl methacrylate as the monomer having a skeleton possessing photostabilizing activity was added.

Ink Compositions

Ink compositions containing the colorants prepared above were prepared according to the following formulations.

Ink C1

| | |
| --- | --- |
| Carbon Black MA7 (manufactured by Mitsubishi Chemical Corporation) | 3.5 wt % |
| Colorant C1 | 1 wt % |
| Styrene/acryl copolymer ammonium salt (dispersant: molecular weight 7000, resin component 38 wt %) | 1.5 wt % |
| Glycerin | 10 wt % |
| Surfynol 465 | 1 wt % |
| Triethylene glycol monobutyl ether | 7 wt % |
| Proxel XL2 (preservative, manufactured by ZENECA) | 0.3 wt % |
| Ion-exchanged water | Balance |

Ink C2

| | |
| --- | --- |
| C.I. Pigment Yellow 74 | 3 wt % |
| Colorant C2 | 1 wt % |
| Styrene/acryl copolymer ammonium salt (dispersant: molecular weight 7000, resin component 38 wt %) | 1.5 wt % |
| Glycerin | 10 wt % |
| Surfynol 465 | 1 wt % |
| Triethylene glycol monobutyl ether | 7 wt % |
| Proxel XL2 | 0.3 wt % |
| Ion-exchanged water | Balance |

Ink C3

| | |
| --- | --- |
| Carbon Black MA7 | 3.5 wt % |
| Colorant C3 | 1 wt % |
| Styrene/acryl copolymer ammonium salt (dispersant: molecular weight 7000, resin component 38 wt %) | 1.5 wt % |
| Glycerin | 10 wt % |
| Surfynol 465 | 1 wt % |
| Triethylene glycol monobutyl ether | 7 wt % |
| Proxel XL2 | 0.3 wt % |
| Ion-exchanged water | Balance |

Ink C4

| | |
| --- | --- |
| Carbon Black MA7 | 3.5 wt % |
| C.I. Direct Black 154 | 1 wt % |
| Styrene/acryl copolymer ammonium salt (dispersant: molecular weight 7000, resin component 38 wt %) | 1.5 wt % |
| Glycerin | 10 wt % |
| Surfynol 465 | 1 wt % |
| Triethylene glycol monobutyl ether | 7 wt % |
| Proxel XL2 | 0.3 wt % |
| Ion-exchanged water | Balance |

Ink C5

| | |
| --- | --- |
| C.I. Pigment Yellow 74 | 3 wt % |
| Styrene/acryl copolymer ammonium salt (dispersant: molecular weight 7000, resin component 38 wt %) | 1.5 wt % |

-continued

| | |
|---|---|
| Glycerin | 10 wt % |
| Surfynol 465 | 1 wt % |
| Triethylene glycol monobutyl ether | 7 wt % |
| Proxel XL2 | 0.3 wt % |
| Ion-exchanged water | Balance |

Ink C6

| | |
|---|---|
| C.I. Pigment Yellow 74 | 3 wt % |
| Colorant C4 | 1 wt % |
| Styrene/acryl copolymer ammonium salt (dispersant: molecular weight 7000, resin component 38 wt %) | 1.5 wt % |
| Glycerin | 10 wt % |
| Surfynol 465 | 1 wt % |
| Triethylene glycol monobutyl ether | 7 wt % |
| Proxel XL2 | 0.3 wt % |
| Ion-exchanged water | Balance |

Evaluation Test

Evaluation C1: Lightfastness Test 2

The test was carried out in the same manner as used in the evaluation test B1.

Evaluation C2: Lightfastness Test 1

The test was carried out in the same manner as used in the evaluation test B2.

Evaluation C3: Waterfastness

The test was carried out in the same manner as used in the evaluation test B3.

Evaluation C4: Rubbing/Scratch Resistance

The test was carried out in the same manner as used in the evaluation test B4.

Evaluation C5: OD Value

Blotted images were printed on all the following recording papers in the same manner as described above in connection with the evaluation test B1.

① Xerox P (Xerox Corp.)
② Ricopy 6200 (Ricoh Co. Ltd.)
③ (Xerox 4024 3R 721 (Xerox Corp.)
④ Neenah Bond (Kimberly-Clark)
⑤ Xerox R (Xerox Corp.)
⑥ Yamayuri (Honshu Paper Co., Ltd.)

For the blotted image area, the optical density (OD value) was measured in the same manner as described above in connection with the evaluation test 1. The average of the OD values for the six papers was determined. The average value was evaluated according to the following criteria.

A: Average OD value of not less than 1.30
B: Average OD value of not less than 1.20 to less than 1.30
C: Average OD value of less than 1.20

The results of evaluation were as summarized in the following table.

| Ink | Lightfastness Color difference | Lightfastness OD value | Water-fastness | Rubbing/scratch resistance | OD value |
|---|---|---|---|---|---|
| C1 | A | A | A | A | A |
| C2 | A | A | A | A | A |
| C3 | C | C | A | A | A |
| C4 | C | C | B | B | A |
| C5 | C | C | A | B | B |
| C6 | C | C | A | A | A |

What is claimed is:

1. An ink composition comprising a colorant comprising a dye or a pigment and a polymer encapsulating the dye or pigment and having, in its molecular chain, sites possessing ultraviolet absorbing activity and photostabilizing activity; water; and a water-soluble organic solvent, wherein the polymer encapsulated colorant is in the form of a fine particle in the ink composition and the polymer has a glass transition point of 30° C. or below and comprises a carboxyl or sulfonic acid group, and wherein the polymer encapsulated colorant is produced by a process consisting essentially of dissolving or dispersing the dye or pigment in the monomers for constituting the polymer to form a solution or dispersion and subjecting the solution or dispersion to emulsion polymerization in water in the presence of a polymerization catalyst and an emulsifier.

2. The ink composition according to claim 1, wherein either the weight average molecular weight or the number average molecular weight of the polymer is 1,000 to 50,000.

3. The ink composition according to claim 1, wherein the polymer has hydrophilic and hydrophobic groups.

4. The ink composition according to claim 3, wherein the hydrophobic group is at least one member selected from the group consisting of alkyl, substituted alkyl, aromatic monocyclic hydrocarbon, fused polycyclic aromatic hydrocarbon, heteromonocyclic, and fused heterocyclic groups.

5. The ink composition according to claim 3, wherein the polymer is a random copolymer, a block copolymer, or a graft copolymer.

6. The ink composition according to claim 3, wherein the polymer comprises at least one member selected from the group consisting of phosphoric acid, amido, and amino groups.

7. The ink composition according claim 1, which further comprises polymeric fine particles having a diameter of 5 to 200 nm.

8. The ink composition according not claim 7, wherein the polymeric fine particles are dispersed particles of a polymer emulsion having a minimum film-forming temperature of 30° C. or below.

9. The ink composition according to claim 1, wherein the polymer comprises a thermoplastic polymer.

10. The ink composition according to claim 9, wherein the thermoplastic polymer is selected from the group consisting of an ethylene/vinyl acetate copolymer, an ethylene/ethyl acrylate copolymer, polyethylene, polypropylene, polystyrene, a poly(meth) acrylic ester, a styrene/(meth) acrylic ester copolymer, a styrene/maleic acid copolymer, a styrene/itaconic ester copolymer, polyvinyl acetate, polyester, polyurethane, and polyamide.

11. The ink composition according to claim 1, wherein a site possessing the ultraviolet-absorbing activity and the photostabilizing activity is selected from the group consisting of aromatic monocyclic hydrocarbon, fused polycyclic aromatic hydrocarbon, heteromonocyclic, and fused heterocyclic groups, and has absorbing activity in a wavelength region from 200 to 400 nm.

12. The ink composition according to claim 1, wherein a site possessing the ultraviolet absorbing activity and the photostabilizing activity has a benzotriazole, benzophenone, salicylate, cyanoacrylate, hindered phenol, or hindered amine skeleton.

13. The ink composition according to claim 1, wherein the polymer is a polymer or a copolymer using, as a monomer, a benzotraizole ultraviolet absorber having an ethylenically unsaturated bond, a benzophenone ultraviolet absorber having an ethylenically unsaturated bond, a salicylate ultraviolet absorber having an ethylenically unsaturated bond, a cyanoacrylate ultraviolet absorber having an ethylenically unsaturated bond, a hindered phenol ultraviolet absorber having an ethylenically unsaturated bond, or a hindered amine photostabilizer having an ethylenically unsaturated bond.

14. A recording method comprising the step of depositing an ink composition onto a recording medium to perform printing, the ink composition being one according to claim 1.

15. A record printed by the recording method according to claim 14.

16. An ink jet recording method comprising the steps of: ejecting a droplet of an ink composition; and depositing the droplet onto a recording medium to perform printing, the ink composition being one according to claim 1.

17. The ink composition according to claim 1, wherein water is present in the ink composition in an amount that is greater than an amount of the colorant, the polymer and the water-soluble organic solvent together.

18. The ink composition according to claim 1, wherein the water-soluble organic solvent has a boiling point of 180° C. or above.

19. The ink composition according to claim 1, wherein the colorant has a particle diameter of 5 to 500 nm.

20. The ink composition according to claim 1, which further comprises another colorant.

21. An ink composition comprising a colorant comprising a dye or a pigment and a polymer encapsulating the dye or pigment and having, in its molecular chain, sites possessing ultraviolet absorbing activity and photostabilizing activity; water; and a water-soluble organic solvent, wherein the polymer encapsulated colorant is in the form of a fine particle in the ink composition and the polymer has a glass transition point of 30° C. or below and comprises a carboxyl or sulfonic acid group, and wherein the polymer encapsulated colorant is produced by polymerizing monomers for constituting the polymer in the presence of the dye or pigment; wherein the polymer encapsulated colorant consists of the dye or pigment and the polymer having, in its molecular chain, sites possessing ultraviolet and photostabilizing activity.

* * * * *